(12) United States Patent
Rao

(10) Patent No.: US 11,701,876 B2
(45) Date of Patent: Jul. 18, 2023

(54) LAMINATION METHOD FOR SPECIAL-SHAPED GLASS COVER PLATE AND DISPLAY DEVICE

(71) Applicant: Wuhan China Star Optoelectronics Semiconductor Display Technology Co., Ltd., Wuhan (CN)

(72) Inventor: Ping Rao, Wuhan (CN)

(73) Assignee: Wuhan China Star Optoelectronics Semiconductor Display Technology Co., Ltd., Hubei (CN)

( * ) Notice: Subject to any disclaimer, the term of this patent is extended or adjusted under 35 U.S.C. 154(b) by 304 days.

(21) Appl. No.: 16/956,640

(22) PCT Filed: Apr. 10, 2020

(86) PCT No.: PCT/CN2020/084224
§ 371 (c)(1),
(2) Date: Jun. 22, 2020

(87) PCT Pub. No.: WO2021/189554
PCT Pub. Date: Sep. 30, 2021

(65) Prior Publication Data
US 2022/0118751 A1 Apr. 21, 2022

(30) Foreign Application Priority Data
Mar. 26, 2020 (CN) .......................... 202010222157.4

(51) Int. Cl.
*B32B 37/10* (2006.01)
*B32B 17/06* (2006.01)
(Continued)

(52) U.S. Cl.
CPC .............. *B32B 37/10* (2013.01); *B32B 17/06* (2013.01); *B32B 37/18* (2013.01); *F16B 1/00* (2013.01);
(Continued)

(58) Field of Classification Search
CPC .................... B32B 2037/1081; B32B 38/1866
(Continued)

(56) References Cited

U.S. PATENT DOCUMENTS

| 2018/0186119 A1* | 7/2018 | Yang ........................ B32B 7/025 |
| 2019/0179182 A1* | 6/2019 | Zuo ........................ G06F 3/041 |
| 2019/0348641 A1 | 11/2019 | Jung et al. |

FOREIGN PATENT DOCUMENTS

| CN | 108766982 | 11/2018 |
| CN | 109532193 | 3/2019 |

(Continued)

OTHER PUBLICATIONS

CN109795201A_machine_translation (Year: 2019).*

*Primary Examiner* — Francisco W Tschen
*Assistant Examiner* — Abhishek A Patwardhan
(74) *Attorney, Agent, or Firm* — PV IP PC; Wei Te Chung; Zhigang Ma

(57) ABSTRACT

The present invention provides a lamination method for a special-shaped glass cover plate, including following steps. Step S1: forming a magnetic layer on a display panel. Step S2: arranging a first solenoid and a second solenoid at a regular-shaped portion and a special-shaped portion of the special-shaped glass cover plate, respectively. Step S3: supplying opposite electric currents to the first solenoid and the second solenoid. Step S4: changing magnitude of an electric current from the regular-shaped portion to the special-shaped portion. Step S5: when to attach the display panel to the special-shaped portion of the special-shaped glass cover plate, changing magnitude of the electric current of the second solenoid and a direction of the second solenoid to attach the display panel along the special-shaped portion.

10 Claims, 1 Drawing Sheet

(51) Int. Cl.
*B32B 37/18* (2006.01)
*F16B 1/00* (2006.01)
(52) U.S. Cl.
CPC ... *B32B 2037/1081* (2013.01); *B32B 2457/20* (2013.01); *F16B 2001/0035* (2013.01)
(58) Field of Classification Search
USPC .................................................... 156/272.4
See application file for complete search history.

(56) References Cited

FOREIGN PATENT DOCUMENTS

| | | | |
|---|---|---|---|
| CN | 109795201 | | 5/2019 |
| CN | 109795201 A | * | 5/2019 |
| CN | 110268308 | | 9/2019 |
| CN | 110588132 | | 12/2019 |
| KR | 10-2015-0033969 | | 4/2015 |

* cited by examiner

LAMINATION METHOD FOR SPECIAL-SHAPED GLASS COVER PLATE AND DISPLAY DEVICE

RELATED APPLICATIONS

This application is a National Phase of PCT Patent Application No. PCT/CN2020/084224 having International filing date of Apr. 10, 2020, which claims the benefit of priority of Chinese Patent Application No. 202010222157.4 filed on Mar. 26, 2020. The contents of the above applications are all incorporated by reference as if fully set forth herein in their entirety.

FIELD AND BACKGROUND OF THE INVENTION

The present application relates to a field of manufacturing of display devices and in particular to a lamination method for a special-shaped glass cover plate and a display device.

The competition in the mobile phone industry is becoming more and more intense now. In order to stand out from the competition, in addition to developing functions and technology, making innovations to improve the appearance and structure of a mobile phone is also a good approach to take. Therefore, there has been a lot of novel designs emerged in the mobile phone industry, such as curved screens, waterfall screens, hyperboloid screens, quadric curved screens, and folding screens. However, since these novel designs are all special-shaped designs, it is a big challenge to carry out a conventional lamination method for display panels. At present, the conventional lamination method uses a roller or a tool of a laminating device to attach a film to a glass cover plate. However, in such operations, if the roller exerts too much pressure, there will be a problem of detachment of the film, and if the roller exerts insufficient pressure, bubbles are generated. Moreover, when attaching a special-shaped glass cover plate, there is a problem of attaching the film, that is, a portion of the film is not well attached to a special-shaped portion of the special-shaped glass cover plate during a lamination process, resulting in abnormal film attachment.

Therefore, a new lamination method is needed to attach the special-shaped glass cover plate.

SUMMARY OF THE INVENTION

The present invention provides a lamination method for a special-shaped glass cover plate and a display device. By coating a display panel with a magnetic layer and changing magnitude and a direction of a magnetic field, the glass cover plate is attached perfectly.

The present invention provides technical solutions as follows.

The present invention provides a lamination method for a special-shaped glass cover plate, comprising following steps:

step S1: coating a display panel with a magnetic material to form a magnetic layer;

step S2: arranging a first solenoid and a second solenoid at a regular-shaped portion and a special-shaped portion of the special-shaped glass cover plate, respectively;

step S3: supplying opposite electric currents to the first solenoid at the regular-shaped portion and the second solenoid at the special-shaped portion;

step S4: changing magnitude of an electric current from the regular-shaped portion to the special-shaped portion to attach the display panel along an inner surface of the special-shaped glass cover plate; and step S5: when to attach the display panel to the special-shaped portion of the special-shaped glass cover plate, reducing magnitude of the electric current of the first solenoid and changing magnitude of the electric current of the second solenoid and a direction of the second solenoid to attach the display panel along the special-shaped portion of the special-shaped glass cover plate;

wherein in step S1, the magnetic material of the magnetic layer is a transparent magnetic material; and in step S2, the first solenoid and the second solenoid are the same or different solenoids.

According to the lamination method for the special-shaped glass cover plate of the present invention, in step S2, after supplying electric currents to the first solenoid and the second solenoid, both the first solenoid and the second solenoid generate magnetic fields, and magnitude of the magnetic fields generated by the first solenoid and the second solenoid is affected by magnitude of the supplied electric currents.

According to the lamination method for the special-shaped glass cover plate of the present invention, in step S3, after supplying the opposite electric currents to the first solenoid and the second solenoid, the regular-shaped portion and the magnetic material are of opposite magnetic polarities and attract each other; and the special-shaped portion and the magnetic material are of a same magnetic polarity and repulse each other.

According to the lamination method for the special-shaped glass cover plate of the present invention, in step S4, by changing the magnitude of the electric current from the regular-shaped portion to the special-shaped portion, magnitude of a magnetic field from the regular-shaped portion to the special-shaped portion is changed.

The present invention provides a lamination method for a special-shaped glass cover plate, comprising following steps:

step S1: coating a display panel with a magnetic material to form a magnetic layer;

step S2: arranging a first solenoid and a second solenoid at a regular-shaped portion and a special-shaped portion of the special-shaped glass cover plate, respectively;

step S3: supplying opposite electric currents to the first solenoid at the regular-shaped portion and the second solenoid at the special-shaped portion;

step S4: changing magnitude of an electric current from the regular-shaped portion to the special-shaped portion to attach the display panel along an inner surface of the special-shaped glass cover plate; and step S5: when to attach the display panel to the special-shaped portion of the special-shaped glass cover plate, reducing magnitude of the electric current of the first solenoid, changing magnitude of the electric current of the second solenoid and a direction of the second solenoid, so that the display panel is attached along the special-shaped portion of the special-shaped glass cover plate.

According to the lamination method for the special-shaped glass cover plate of the present invention, in step S1, the magnetic material of the magnetic layer is a transparent magnetic material.

According to the lamination method for the special-shaped glass cover plate of the present invention, in step S2, the first solenoid and the second solenoid are the same or different solenoids.

According to the lamination method for the special-shaped glass cover plate of the present invention, in step S2, after supplying electric currents to the first solenoid and the second solenoid, both the first solenoid and the second solenoid generate magnetic fields, magnitude of the magnetic fields generated by the first solenoid and the second solenoid is affected by magnitude of the supplied electric currents.

According to the lamination method for the special-shaped glass cover plate of the present invention, in step S3, after supplying opposite electric currents to the first solenoid and the second solenoid, the regular-shaped portion and the magnetic material are of opposite magnetic polarities and attract each other; and the special-shaped portion and the magnetic material are of a same magnetic polarity and repulse each other.

According to the lamination method for the special-shaped glass cover plate of the present invention, in step S4, by changing the magnitude of the electric current from the regular-shaped portion to the special-shaped portion, magnitude of a magnetic field from the regular-shaped portion to the special-shaped portion is changed.

The present invention provides a display device, comprising:
a display panel;
a special-shaped glass cover plate disposed on the display panel; and
a magnetic layer disposed on the display panel, wherein the magnetic layer is attached to the special-shaped glass cover plate.

According to the display device of the present invention, the magnetic layer is made of a transparent magnetic material.

According to the display device of the present invention, the display device uses a solenoid to perform a lamination process of attaching the display panel to the special-shaped glass cover plate.

According to the display device of the present invention, the solenoid is fed with an electric current to generate a magnetic field, and the magnetic field and the magnetic material attract or repel each other.

In the lamination method for the special-shaped glass cover plate and the display device provided by the present invention, the display panel is coated with a layer of magnetic material and then two solenoids are arranged on the special-shaped glass cover plate. By adjusting the magnitude of the electric currents of the two solenoids and the direction of the solenoid, the two solenoids generate magnetic forces in different directions and different magnetic field strengths, so that the magnetic force changes along an outline of an outer surface of the special-shaped glass cover plate, and thereby the display panel is attached smoothly on the special-shaped glass cover plate, thus effectively solving a problem of attaching the special-shaped glass cover plate.

BRIEF DESCRIPTION OF THE SEVERAL VIEWS OF THE DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without inventive work.

DESCRIPTION OF SPECIFIC EMBODIMENTS OF THE INVENTION

Figure 1:
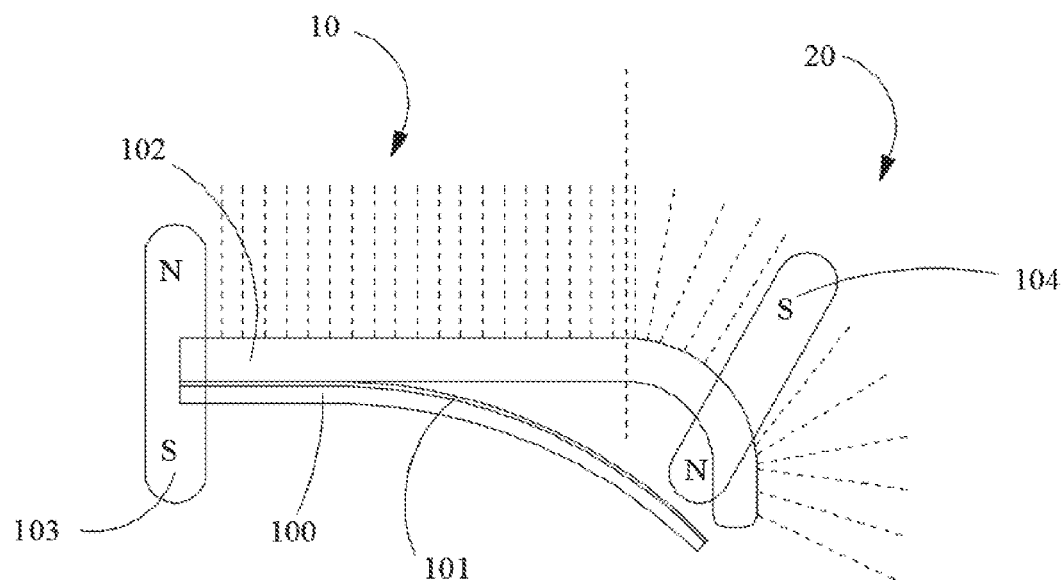
FIG. 1 is a schematic view illustrating a lamination method for a special-shaped glass cover plate according to one embodiment of the present invention.

Technical solutions of the present invention will be clearly and completely described below with reference to the accompanying drawings and in conjunction with specific embodiments. Obviously, the described embodiments are only some of the embodiments of the present invention, but not all the embodiments. Based on the embodiments of the present invention, all other embodiments obtained by those skilled in the art without creative work fall into the protection scope of the present invention.

In the description of the present invention, it should be understood that the directional terms, such as "center", "longitudinal", "transverse", "length", "width", "thickness", "upper", "lower", "front", "rear", "left", "right", "vertical", "horizontal", "top", "bottom", "inside", "outside", "clockwise", "counterclockwise", are based on the orientation or positional relationship shown in the drawings, and are only for the convenience of describing the present invention and simplifying the description. The directional terms do not indicate or imply that the device or element referred to must have a specific orientation or be constructed or operated in a specific orientation. Therefore, the directional terms cannot be understood as a limitation to the present invention. In addition, the terms "first" and "second" are used for illustrative purposes only, and cannot be understood as indicating or implying relative importance or implicitly indicating the number of technical features indicated. Therefore, the features defined as "first" and "second" may explicitly or implicitly include one or more of the features. In the description of the present invention, "multiple" means two or more, unless specifically defined otherwise.

In the description of the present invention, it should be noted that the terms "mounted", "connected", and "coupled" should be understood in a broad sense unless otherwise specified and defined. For example, it can be a fixed connection, a detachable connection, or an integral connection; it can be a mechanical connection, an electrical connection, or two elements can communicate with each other. Two elements can be directly connected to each other or can be indirectly connected through an intermediate medium, or they are connected internally or interact with each other. For those of ordinary skill in the art, the specific meanings of the above terms in the present invention can be understood on a case-by-case basis.

In the present invention, unless explicitly stated and defined otherwise, a first element being "upper" or "lower" a second element may indicate that, the first element is in direct contact with the second element, or can mean that, the first element is not in direct contact with the second element, and instead they make contact through another element between them. Moreover, the first element being "above", "over", and "on" the second element can indicate that the first element is right above and obliquely above the second element, or merely indicates that the first element is higher in level than the second element. The first element being "below", "under", or "beneath" the second element can mean that, the first element is right below or obliquely below the second element, or merely indicates that the first element is lower in level than the second element.

The following disclosure provides many different examples for realizing different structures of the present invention. To simplify the disclosure of the present invention, components and configurations of specific examples are described below. Certainly, they are merely examples and are not intended to limit the present invention. Furthermore, reference numerals and/or reference letters can be repeated in different examples, and such repetition is for the purpose of simplicity and clarity, and does not indicate any relationship between various embodiments and/or configurations discussed. In addition, the present invention provides examples of various specific processes and materials, but those of ordinary skill in the art can be aware of the use of other processes and/or the use of other materials.

Figure 2:
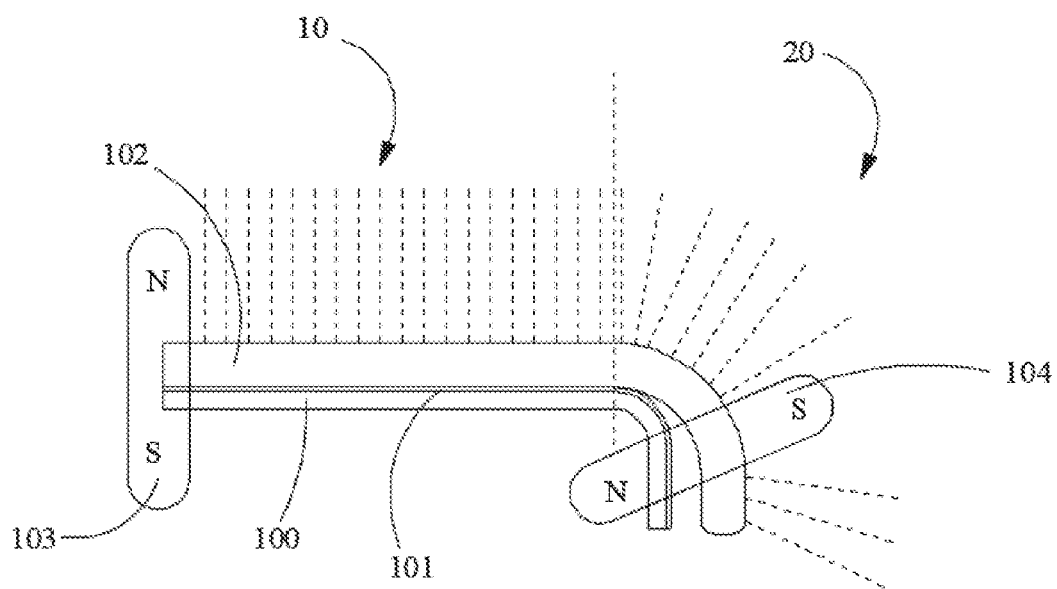
FIG. 2 is another schematic view illustrating the lamination method for the special-shaped glass cover plate according to one embodiment of the present invention.

Please refer to FIG. 1. FIG. 1 is a schematic view illustrating a lamination method for a special-shaped glass cover plate according to one embodiment of the present invention. Please refer to FIG. 2. FIG. 2 is another schematic view illustrating the lamination method for the special-shaped glass cover plate according to one embodiment of the present invention.

Please refer to FIGS. 1 and 2. The present invention provides a lamination method for a special-shaped glass cover plate. The lamination method is used to attach a display panel 100 to a special-shaped glass cover plate 102. The lamination method comprises following steps:

step S1: coating the display panel 100 with a magnetic material to form a magnetic layer 101;

step S2: arranging a first solenoid 103 and a second solenoid 104 at a regular-shaped portion 10 and a special-shaped portion 20 of the special-shaped glass cover plate 102, respectively;

step S3: supplying opposite electric currents to the first solenoid 103 at the regular-shaped portion 10 and the second solenoid 104 at the special-shaped portion 20;

step S4: slowly changing magnitude of an electric current from the regular-shaped portion 10 to the special-shaped portion 20 to slowly attach the display panel 100 along an inner surface of the special-shaped glass cover plate 102; and step S5: when to attach the display panel 100 to the special-shaped portion 20 of the special-shaped glass cover plate 102, reducing magnitude of the electric current of the first solenoid 103 and changing magnitude of the electric current of the second solenoid 104 and a direction of the second solenoid 104 to slowly attach the display panel 100 along the special-shaped portion 20 of the special-shaped glass cover plate 102.

The magnetic material of the magnetic layer 101 is a transparent magnetic material. The magnetic material does not need to be removed after the process for attachment is completed. The magnetic material is transparent and light-transmissive, and therefore does not affect normal display operations of the display panel 100. As shown in FIG. 1, the special-shaped glass cover plate 102 is divided into two parts: the regular-shaped portion 10 and the special-shaped portion 20. The regular-shaped portion 10 has a straight-plate shape. The first solenoid 103 is arranged at the regular-shaped portion 10 of the special-shaped glass cover plate 102, and the second solenoid 104 is arranged by the special-shaped portion 20. When the process for attachment starts, opposite electric currents are supplied to the first solenoid 103 at the regular-shaped portion 10 and the second solenoid 104 at the special-shaped portion 20. In FIG. 1, the dashed line indicates magnetic field lines generated by the solenoids. When the opposite electric currents are applied to the first solenoid 103 and the second solenoid 104, a magnetic field at the regular-shaped portion 10 and the magnetic layer which coats the display panel 100 are of opposite magnetic polarities, i.e. they are opposite magnetic poles, and the display panel 100 and the regular-shaped portion 10 attract each other. At the same time, a magnetic field generated at the special-shaped portion 20 and the magnetic layer 101 which coats the display panel 100 are of the same magnetic polarity, i.e., they are same magnetic poles, and the display panel 100 and the special-shaped portion 20 repel each other. Then, by slowly changing the magnitude of the electric current in the first solenoid 103 at the regular-shaped portion 10 and the magnitude of the electric current in the second solenoid 104 at the special-shaped portion 20, magnitude of a magnetic field from the regular-shaped portion 10 to the special-shaped portion 20 becomes different, that is, a magnetic force between the display panel 100 and the special-shaped glass cover plate 102 is different, so that the display panel 100 is slowly attached along an inner surface of the special-shaped glass cover plate 102.

Referring to FIG. 2, when to attach the display panel 100 to the special-shaped portion 20 of the special-shaped glass cover plate 102, the magnitude of the electric current in the first solenoid 103 at the regular-shaped portion 10 is reduced, that is, the magnitude of the magnetic field at regular-shaped portion 10 is reduced, and the magnitude of the electric current in the second solenoid 104 at the special-shaped portion 20 and a direction of the second solenoid 104 are changed, that is, the magnitude of the magnetic field and a magnetic field direction at the special-shaped portion 20 are changed, so that the display panel 100 is slowly attached along the special-shaped portion 20 of the special-shaped glass cover plate 102.

In the present embodiment, the first solenoid 103 and the second solenoid 104 are the same solenoid or different solenoids. Both the first solenoid 103 and the second solenoid 104 can generate magnetic fields when they are fed with electric currents, the magnitude of the electric currents carried in the first solenoid 103 and the second solenoid 104 affect the magnitude of the magnetic fields generated by the first solenoid 103 and the second solenoid 104, and the directions of the first solenoid 103 and the second solenoid 104 affect directions of the magnetic fields generated by the first solenoid 103 and the second solenoid 104.

The lamination method for the special-shaped glass cover plate in the present embodiment utilizes the interaction between magnetic fields. The lamination method causes no problems like squeezing the display panel during the process for attachment, nor does it cause detachment of the display panel. In addition to that, no bubbles are generated during the process for attachment. Moreover, because of the attraction and repulsion between the magnetic forces of the magnetic fields, the display panel can be attached along an outline of the special-shaped glass cover plate, thereby perfectly solving the problem in attaching the special-shaped glass cover plate.

As shown in FIG. 1, the present embodiment also provides a display device having a special-shaped glass cover plate 102. The display device is provided with a magnetic layer 101 on a display panel 100, and the magnetic layer 101 is attached to the special-shaped glass cover plate 102. The magnetic layer 101 is made of a transparent magnetic material, the display device uses a solenoid to carry out a process for attaching the display panel 100 to the special-shaped glass cover plate 102, wherein the solenoid is fed with an electric current to create a magnetic field to attract or repulse the magnetic material.

The display device provided in the present embodiment uses the lamination method for the special-shaped glass cover plate. The special-shaped glass cover plate 102 is divided into two parts: a regular-shaped portion 10 and a special-shaped portion 20. A first solenoid 103 is arranged at the regular-shaped portion 10 of the special-shaped glass cover plate 102, and a second solenoid 104 is arranged by the special-shaped portion 20. When the process for attachment starts, opposite electric currents are supplied to the first solenoid 103 at the regular-shaped portion 10 and the second solenoid 104 at the special-shaped portion 20. After opposite electric currents are applied to the first solenoid 103 and the second solenoid 104, the magnetic field generated at the regular-shaped portion 10 and the magnetic layer which coats the display panel 100 are of opposite magnetic polarities, that is, they are opposite magnetic poles, and the display panel 100 and the regular-shaped portion 10 are attracted to each other. At the same time, the magnetic field generated at the special-shaped portion 20 and the magnetic layer 101 which coats the display panel 100 are of the same magnetic polarity, that is, they are same magnetic poles, and the display panel 100 and the special-shaped portion 20 repel each other. Then, by slowly changing the magnitude of the electric current in the first solenoid 103 at the regular-shaped portion 10 and the magnitude of the electric current in the second solenoid 104 at the special-shaped portion 20, magnitude of a magnetic field from the regular-shaped portion 10 to the special-shaped portion 20 becomes different, that is, a magnetic force between the display panel 100 and the special-shaped glass cover plate 102 is different, and therefore the display panel 100 is slowly attached along an inner surface of the special-shaped glass cover plate 102.

When the display panel 100 is gradually attached to the special-shaped portion 20 of the special-shaped glass cover plate 102, the electric current in the first solenoid 103 at the regular-shaped portion 10 is reduced, that is, the magnitude of the magnetic field at the regular-shaped portion 10 is reduced, and the magnitude of the electric current in the second solenoid 104 at the special-shaped portion 20 and a direction of the second solenoid 104 are changed, that is, the magnitude of the magnetic field and a magnetic field direction at the special-shaped portion 20 are changed, so that the display panel 100 is slowly attached along the special-shaped portion 20 of the special-shaped glass cover plate 102.

Preferably, other types of glass cover plates, such as the glass cover plates of curved screens, waterfall screens, hyperboloid screens, quadric-curved screens, and other double-U shaped screens, can adopt a similar lamination method, that is, placing a solenoid along an outline of a glass cover plate, and by controlling magnitude of an electric current flowing into the solenoid and a direction of the solenoid, a display panel can be attached normally in any lamination area. A detailed description is not repeated herein for brevity.

In the lamination method for the special-shaped glass cover plate and the display device provided by the present invention, the display panel is coated with the magnetic material. Then, by arranging two solenoids on the special-shaped glass cover plate, and adjusting the magnitude of the electric currents of the two solenoids and the direction of the solenoid, the two solenoids generate magnetic forces in different directions and different magnetic field strengths, so that the magnetic force changes along an outline of an outer surface of the special-shaped glass cover plate, and thereby the display panel is attached smoothly and perfectly on the special-shaped glass cover plate, thus effectively solving a problem in attaching the special-shaped glass cover plate.

The above describes a lamination method for a special-shaped glass cover plate and a display device provided in the embodiments of the present application. Specific examples are used to explain the working principles and embodiments of the present application. The descriptions of the above embodiments are only provided for ease of understanding the technical solutions and main ideas of the present application. Those of ordinary skill in the art can modify the technical solutions described in the foregoing embodiments, or equivalently replace some of the technical features. Such modification or replacement is deemed to be within the protection scope of the present application.

What is claimed is:

1. A lamination method for a special-shaped glass cover plate, comprising following steps: step S1: coating a display panel with a magnetic material to form a magnetic layer; step S2: arranging a first solenoid and a second solenoid at a regular-shaped portion and a special-shaped portion of the special-shaped glass cover plate, respectively; step S3: supplying opposite electric currents to the first solenoid at the regular-shaped portion and the second solenoid at the special-shaped portion, so that the regular-shaped portion and the special-shaped portion are of opposite magnetic polarities; step S4: changing magnitude of an electric current from the regular-shaped portion to the special-shaped portion to attach the display panel along an inner surface of the special-shaped glass cover plate; and step S5: when to attach the display panel to the special-shaped portion of the special-shaped glass cover plate, reducing magnitude of the electric current of the first solenoid and changing magnitude of the electric current of the second solenoid and a direction of the second solenoid to attach the display panel along the special-shaped portion of the special-shaped glass cover plate; wherein in step S1, the magnetic material of the magnetic layer is a transparent magnetic material; and in step S2, the first solenoid and the second solenoid are the same or different types of solenoids.

2. The lamination method for the special-shaped glass cover plate according to claim 1, wherein in step S2, after supplying electric currents to the first solenoid and the second solenoid, both the first solenoid and the second solenoid generate magnetic fields, and magnitude of the magnetic fields generated by the first solenoid and the second solenoid is affected by magnitude of the supplied electric currents.

3. The lamination method for the special-shaped glass cover plate according to claim 1, wherein in step S3, after supplying the opposite electric currents to the first solenoid and the second solenoid, the regular-shaped portion and the magnetic material are of opposite magnetic polarities to attract each other, and the special-shaped portion and the magnetic material are of a same magnetic polarity to repulse each other.

4. The lamination method for the special-shaped glass cover plate according to claim 1, wherein in step S4, by changing the magnitude of the electric current from the regular-shaped portion to the special-shaped portion, magnitude of a magnetic field from the regular-shaped portion to the special-shaped portion is changed.

5. A lamination method for a special-shaped glass cover plate, comprising following steps:
   step S1: coating a display panel with a magnetic material to form a magnetic layer;
   step S2: arranging a first solenoid and a second solenoid at a regular-shaped portion and a special-shaped portion of the special-shaped glass cover plate, respectively;
   step S3: supplying opposite electric currents to the first solenoid at the regular-shaped portion and the second solenoid at the special-shaped portion, so that the regular-shaped portion and the special-shaped portion are of opposite magnetic polarities;

step S4: changing magnitude of an electric current from the regular-shaped portion to the special-shaped portion to attach the display panel along an inner surface of the special-shaped glass cover plate; and step S5: when to attach the display panel to the special-shaped portion of the special-shaped glass cover plate, reducing magnitude of the electric current of the first solenoid, changing magnitude of the electric current of the second solenoid and a direction of the second solenoid, so that the display panel is attached along the special-shaped portion of the special-shaped glass cover plate.

6. The lamination method for the special-shaped glass cover plate according to claim 5, wherein in step S1, the magnetic material of the magnetic layer is a transparent magnetic material.

7. The lamination method for the special-shaped glass cover plate according to claim 5, wherein in step S2, the first solenoid and the second solenoid are the same or different types of solenoids.

8. The lamination method for the special-shaped glass cover plate according to claim 7, wherein in step S2, after supplying electric currents to the first solenoid and the second solenoid, both the first solenoid and the second solenoid generate magnetic fields, magnitude of the magnetic fields generated by the first solenoid and the second solenoid is affected by magnitude of the supplied electric currents.

9. The lamination method for the special-shaped glass cover plate according to claim 5, wherein in step S3, after supplying opposite electric currents to the first solenoid and the second solenoid, the regular-shaped portion and the magnetic material are of opposite magnetic polarities to attract each other, and the special-shaped portion and the magnetic material are of a same magnetic polarity to repulse each other.

10. The lamination method for the special-shaped glass cover plate according to claim 5, wherein in step S4, by changing the magnitude of the electric current from the regular-shaped portion to the special-shaped portion, magnitude of a magnetic field from the regular-shaped portion to the special-shaped portion is changed.

* * * * *